US011958473B2

(12) United States Patent
Lin et al.

(10) Patent No.: US 11,958,473 B2
(45) Date of Patent: *Apr. 16, 2024

(54) SYSTEM AND METHOD FOR USING HUMAN DRIVING PATTERNS TO DETECT AND CORRECT ABNORMAL DRIVING BEHAVIORS OF AUTONOMOUS VEHICLES

(71) Applicant: TuSimple, Inc., San Diego, CA (US)

(72) Inventors: Wutu Lin, San Diego, CA (US); Liu Liu, San Diego, CA (US); Xing Sun, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 17/350,297

(22) Filed: Jun. 17, 2021

(65) Prior Publication Data
US 2021/0309210 A1    Oct. 7, 2021

Related U.S. Application Data

(63) Continuation of application No. 16/416,244, filed on May 19, 2019, now Pat. No. 11,040,710, which is a
(Continued)

(51) Int. Cl.
*G05D 1/00* (2006.01)
*B60W 30/02* (2012.01)
(Continued)

(52) U.S. Cl.
CPC .......... *B60W 30/02* (2013.01); *G05D 1/0088* (2013.01); *G06N 20/00* (2019.01);
(Continued)

(58) Field of Classification Search
CPC ............ B60W 30/02; B60W 2540/30; B60W 2710/18; B60W 2710/20; G05D 1/0088;
(Continued)

(56) References Cited

U.S. PATENT DOCUMENTS 6,777,904 B1   8/2004   Degner
7,103,460 B1   9/2006   Breed
(Continued)

FOREIGN PATENT DOCUMENTS

EP   1754179 A1   2/2007
EP   2448251 A2   5/2012
(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.
(Continued)

*Primary Examiner* — Shardul D Patel
(74) *Attorney, Agent, or Firm* — Inventive Law Inc.; Jim H. Salter

(57) ABSTRACT

A system and method for using human driving patterns to detect and correct abnormal driving behaviors of autonomous vehicles are disclosed. A particular embodiment includes: generating data corresponding to a normal driving behavior safe zone; receiving a proposed vehicle control command; comparing the proposed vehicle control command with the normal driving behavior safe zone; and issuing a warning alert if the proposed vehicle control command is outside of the normal driving behavior safe zone. Another embodiment includes modifying the proposed vehicle control command to produce a modified and validated vehicle control command if the proposed vehicle control command is outside of the normal driving behavior safe zone.

20 Claims, 10 Drawing Sheets

Related U.S. Application Data continuation of application No. 15/640,521, filed on Jul. 1, 2017, now Pat. No. 10,308,242.

(51) Int. Cl.
  *G06N 20/00* (2019.01)
  *G06N 3/08* (2023.01)

(52) U.S. Cl.
  CPC ..... *B60W 2540/30* (2013.01); *B60W 2710/18* (2013.01); *B60W 2710/20* (2013.01); *G06N 3/08* (2013.01)

(58) Field of Classification Search
  CPC ........ G05D 1/00; G06N 99/005; G06N 20/00; G06N 3/08
  USPC .......................................................... 701/27
  See application file for complete search history.

(56) References Cited

U.S. PATENT DOCUMENTS

| | | |
|---|---|---|
| 7,689,559 B2 | 3/2010 | Canright |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,553,088 B2 | 10/2013 | Stein |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-Guzman |
| 9,317,776 B1 | 4/2016 | Honda |
| 9,330,334 B2 | 5/2016 | Lin |
| 9,342,074 B2 | 5/2016 | Dolgov |
| 9,355,635 B2 | 5/2016 | Gao |
| 9,365,214 B2 | 6/2016 | Ben Shalom |
| 9,399,397 B2 | 7/2016 | Mizutani |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,488,979 B1 | 11/2016 | Chambers |
| 9,490,064 B2 | 11/2016 | Hirosawa |
| 9,531,966 B2 | 12/2016 | Stein |
| 9,535,423 B1 | 1/2017 | Debreczeni |
| 9,555,803 B2 | 1/2017 | Pawlicki |
| 9,568,915 B1 | 2/2017 | Berntorp |
| 9,587,952 B1 | 3/2017 | Slusar |
| 9,720,418 B2 | 8/2017 | Stenneth |
| 9,723,097 B2 | 8/2017 | Harris |
| 9,723,099 B2 | 8/2017 | Chen |
| 9,738,280 B2 | 8/2017 | Rayes |
| 9,746,550 B2 | 8/2017 | Nath |
| 10,308,242 B2 * | 6/2019 | Lin ...................... G05D 1/0088 |
| 11,040,710 B2 * | 6/2021 | Lin ...................... G06N 20/00 |
| 2007/0230792 A1 | 10/2007 | Shashua |
| 2008/0249667 A1 | 10/2008 | Horvitz |
| 2009/0040054 A1 | 2/2009 | Wang |
| 2010/0049397 A1 | 2/2010 | Lin |
| 2010/0226564 A1 | 9/2010 | Marchesotti |
| 2010/0228420 A1 | 9/2010 | Lee |
| 2010/0281361 A1 | 11/2010 | Marchesotti |
| 2011/0206282 A1 | 8/2011 | Aisaka |
| 2012/0105639 A1 | 5/2012 | Stein |
| 2012/0140076 A1 | 6/2012 | Rosenbaum |
| 2012/0274629 A1 | 11/2012 | Baek |
| 2014/0145516 A1 | 5/2014 | Hirosawa |
| 2014/0198184 A1 | 7/2014 | Stein |
| 2014/0244096 A1 | 8/2014 | An |
| 2015/0062304 A1 | 3/2015 | Stein |
| 2015/0353082 A1 * | 12/2015 | Lee ...................... B60W 10/20 701/41 |
| 2016/0037064 A1 | 2/2016 | Stein |
| 2016/0094774 A1 | 3/2016 | Li |
| 2016/0129907 A1 | 5/2016 | Kim |
| 2016/0165157 A1 | 6/2016 | Stein |
| 2016/0170413 A1 * | 6/2016 | Mueller ................ B60W 50/00 701/23 |
| 2016/0210528 A1 | 7/2016 | Duan |
| 2016/0321381 A1 | 11/2016 | English |
| 2016/0375907 A1 | 12/2016 | Erban |
| 2018/0141568 A1 * | 5/2018 | Singhal ................ G01S 13/865 |
| 2019/0003839 A1 * | 1/2019 | Hu ........................ G01C 21/32 |
| 2020/0298818 A1 * | 9/2020 | Malone ................ B60W 10/10 |

FOREIGN PATENT DOCUMENTS

| | | |
|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |

(56) References Cited

FOREIGN PATENT DOCUMENTS

| WO | WO/2015/186002 A3 | 12/2015 |
|---|---|---|
| WO | WO/2016/135736 | 9/2016 |
| WO | WO/2017/013875 A1 | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.
Hou, Xiaodi and Zhang, Liqing, "Dynamic Visual Attention: Searching For Coding Length Increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701.01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions On Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
Macaodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.

\* cited by examiner

SYSTEM AND METHOD FOR USING HUMAN DRIVING PATTERNS TO DETECT AND CORRECT ABNORMAL DRIVING BEHAVIORS OF AUTONOMOUS VEHICLES

PRIORITY PATENT APPLICATION

This application is a continuation of U.S. patent application Ser. No. 16/416,244, filed on May 19, 2019, titled "SYSTEM AND METHOD FOR USING HUMAN DRIVING PATTERNS TO DETECT AND CORRECT ABNORMAL DRIVING BEHAVIORS OF AUTONOMOUS VEHICLES," which in turn is a continuation of U.S. patent application Ser. No. 15/640,521, filed on Jul. 1, 2017, titled "SYSTEM AND METHOD FOR USING HUMAN DRIVING PATTERNS TO DETECT AND CORRECT ABNORMAL DRIVING BEHAVIORS OF AUTONOMOUS VEHICLES", the disclosures of which are incorporated herein by reference in its entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2021, TuSimple, All Rights Reserved.

TECHNICAL FIELD

This patent document pertains generally to tools (systems, apparatuses, methodologies, computer program products, etc.) for vehicle control systems, autonomous driving systems, vehicle control command generation, and more particularly, but not by way of limitation, to a system and method for using human driving patterns to detect and correct abnormal driving behaviors of autonomous vehicles.

BACKGROUND

An autonomous vehicle is often configured and controlled to follow a trajectory based on a computed driving path. However, when variables such as obstacles are present on the driving path, the autonomous vehicle must perform control operations so that the vehicle may be safely driven by changing the driving path in real time. The autonomous driving system or control system of the vehicle must make these control adjustments to cause the vehicle to follow the desired trajectory and avoid obstacles. During the process of developing and testing autonomous driving systems, bugs or mistakes from the autonomous vehicle control system might cause dangerous or abnormal maneuvers of the vehicle. These dangerous or abnormal maneuvers can jeopardize the occupants of the autonomous vehicle and other people and property in proximity to the autonomous vehicle.

SUMMARY

A system and method for using human driving patterns to detect and correct abnormal driving behaviors of autonomous vehicles are disclosed herein. The various example embodiments described herein provide a system and method to detect dangerous or abnormal driving maneuvers and to guard the passengers against such situations. An example embodiment first trains a learning module or a normal human driving behavior model with normal driving maneuvers from human driving data. Then, the example embodiment provides a way to measure the distance between the current autonomous driving control process driving command and the corresponding normal human maneuver patterns from the learning module. If the distance is above a preset threshold, the system and method intercept and reduce or truncate the dangerous or abnormal maneuver of the current autonomous driving control process driving command to a preset safe bound and send out a warning.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for using normal human driving patterns to detect and correct abnormal driving behaviors of autonomous vehicles are described herein. An example embodiment disclosed herein can be used in the context of an in-vehicle control system 150 in a vehicle ecosystem 101. In one example embodiment, an in-vehicle control system 150 with a vehicle control module 200 resident in a vehicle 105 can be configured like the architecture and ecosystem 101 illustrated in FIG. 1. However, it will be apparent to those of ordinary skill in the art that the vehicle control module 200 described and claimed herein can be implemented, configured, and used in a variety of other applications and systems as well.

Figure 1:
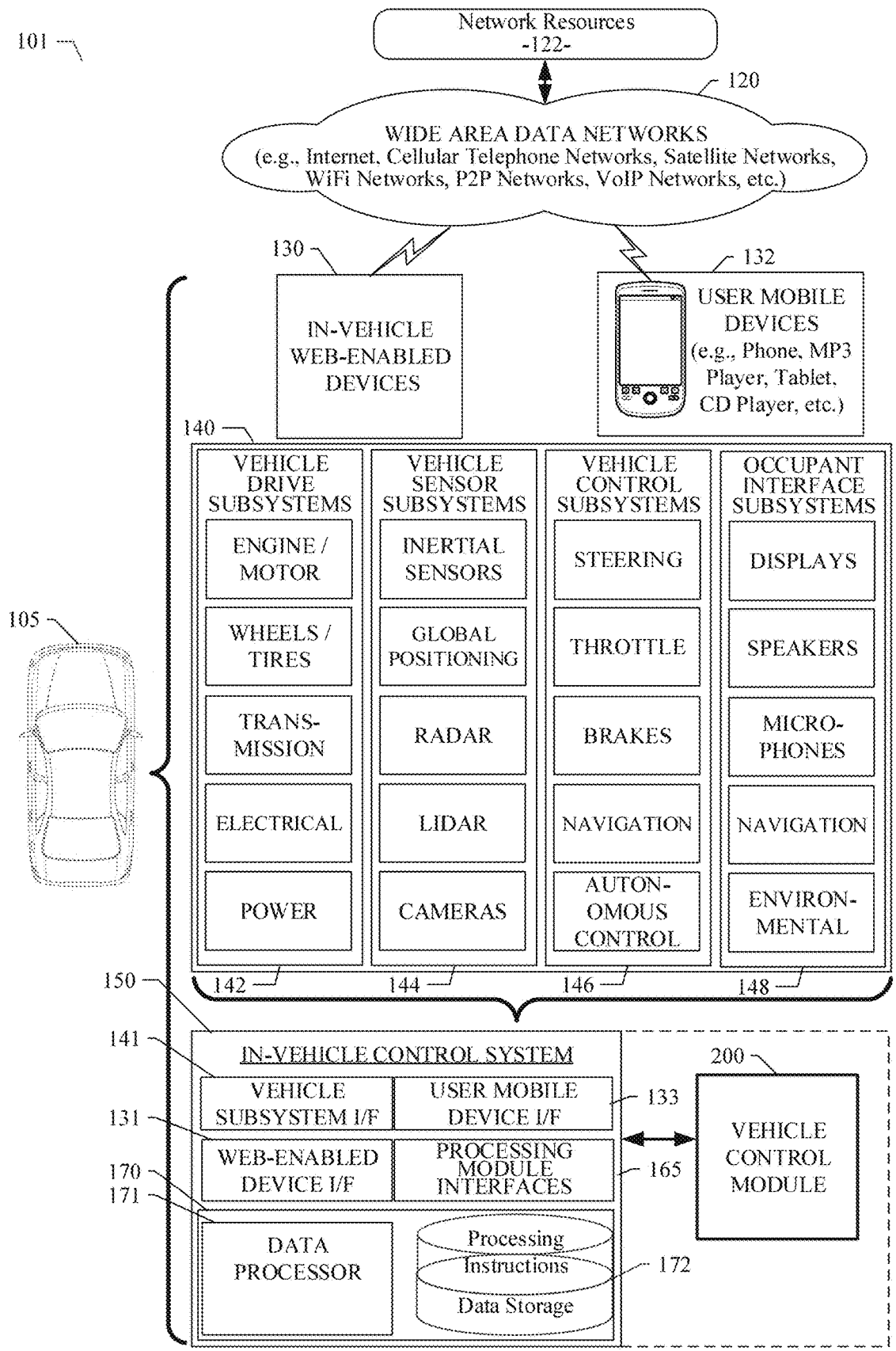
FIG. 1 illustrates a block diagram of an example ecosystem in which a vehicle control module of an example embodiment can be implemented.

Referring now to FIG. 1, a block diagram illustrates an example ecosystem 101 in which an in-vehicle control system 150 and a vehicle control module 200 of an example embodiment can be implemented. These components are described in more detail below. Ecosystem 101 includes a variety of systems and components that can generate and/or deliver one or more sources of information/data and related services to the in-vehicle control system 150 and the vehicle control module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and an image processing module executing therein can receive this image and timing data input. The image processing module can extract object data from the image and timing data to identify objects in the proximity of the vehicle. The in-vehicle control system 150 can process the object data and generate a trajectory for the vehicle based on the detected objects. The trajectory can be used by an autonomous vehicle control subsystem, as another one of the subsystems of vehicle subsystems 140. In an example embodiment, the in-vehicle control system 150 can generate a vehicle control command signal, which can be used by a subsystem of vehicle subsystems 140 to cause the vehicle to traverse the generated trajectory. The autonomous vehicle control subsystem, for example, can use the real-time generated trajectory and vehicle control command signal to safely and efficiently navigate the vehicle 105 through a real world driving scenario while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the vehicle control module 200 for processing data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the vehicle control module 200. In various example embodiments, a plurality of processing modules, configured similarly to vehicle control module 200, can be provided for execution by data processor 171. As shown by the dashed lines in FIG. 1, the vehicle control module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing object input or object input analysis. Antennas can serve to connect the in-vehicle control system 150 and the vehicle control module 200 with the data network 120 via cellular, satellite, radio, or other conventional signal reception mechanisms. Such cellular data networks are currently available (e.g., Verizon™ AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the vehicle control module 200 can receive web-based data or content via an in-vehicle web-enabled device interface 131, which can be used to connect with the in-vehicle web-enabled device receiver 130 and network 120. In this manner, the in-vehicle control system 150 and the vehicle control module 200 can support a variety of network-connectable in-vehicle devices and systems from within a vehicle 105.

As shown in FIG. 1, the in-vehicle control system 150 and the vehicle control module 200 can also receive data, processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, processing control parameters, and content for the in-vehicle control system 150 and the vehicle control module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the vehicle control module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the vehicle control module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an 02 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the vehicle control module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the vehicle control module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 140, the vehicle sensor subsystem 144, the vehicle control subsystem 146, and the occupant interface subsystems 148.

In addition to the processing instructions, the data storage device 172 may store data such as data processing parameters, training data, human driving model data, human driving model parameters, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 140, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and follow a path or trajectory generated by the vehicle control module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and vehicle control module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the vehicle control module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the vehicle control module 200 can be implemented as in-vehicle components of vehicle 105. In various example embodiments, the in-vehicle control system 150 and the vehicle control module 200 in data communication therewith can be implemented as integrated components or as separate components. In an example embodiment, the software components of the in-vehicle control system 150 and/or the vehicle control module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Figure 2:
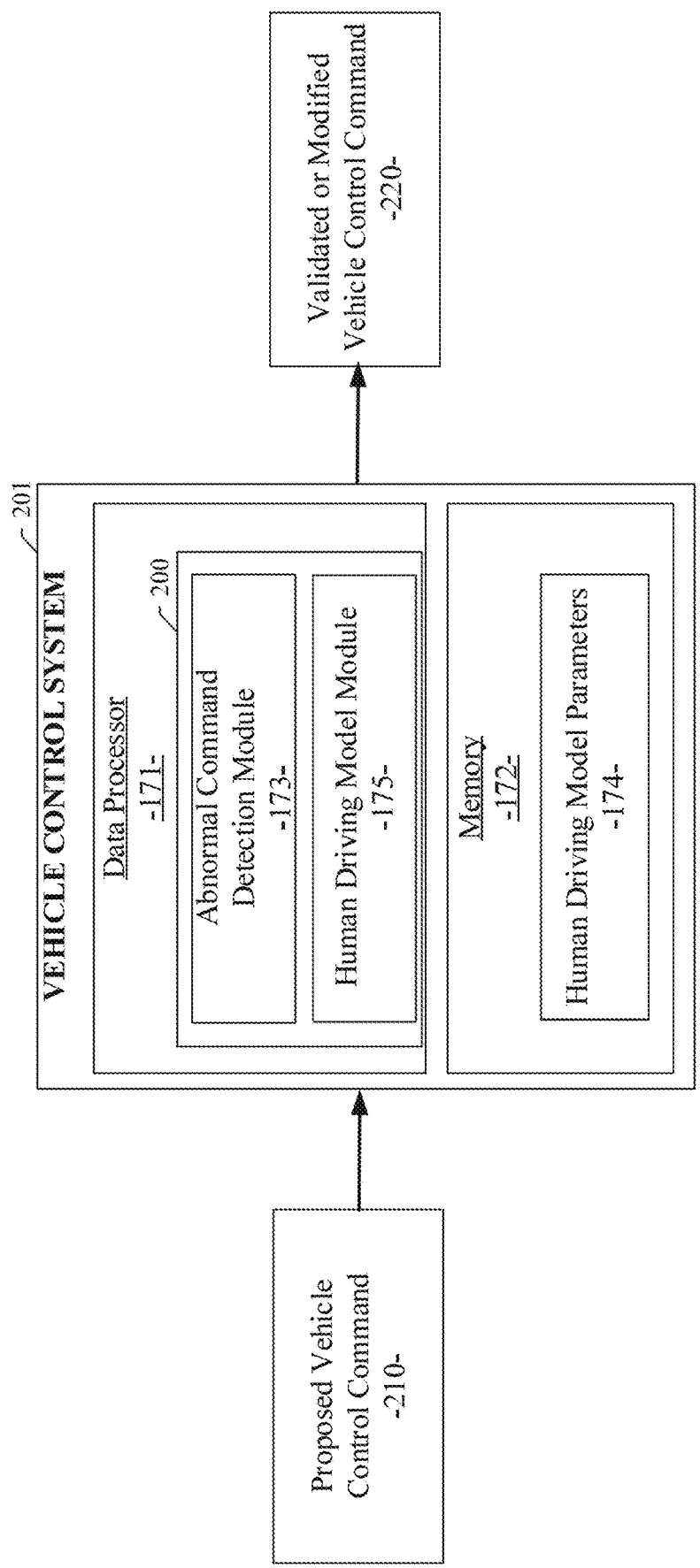
FIG. 2 illustrates the components of the vehicle control system of an example embodiment.

Referring now to FIG. 2, a diagram illustrates the components of a vehicle control system 201 with the vehicle control module 200 of an example embodiment. In the example embodiment, the vehicle control module 200 can be configured to include an abnormal command detection module 173 and a human driving model module 175. As described in more detail below, the abnormal command detection module 173 and the human driving model module 175 serve to enable the detection and correction of an abnormal vehicle control command for the vehicle based on a comparison of a proposed vehicle control command 210 with corresponding normal human driving behavior data maintained by the human driving model module 175. The abnormal command detection module 173 and the human driving model module 175 can be configured as software modules executed by the data processor 171 of the in-vehicle control system 150. The modules 173 and 175 of the vehicle control module 200 can receive a proposed vehicle control command 210 and produce a validated or modified vehicle control command 220, which can be used by the autonomous control subsystem of the vehicle control subsystem 146 to efficiently and safely control the vehicle 105. As part of their abnormal command detection and correction processing, the abnormal command detection module 173 and the human driving model module 175 can be configured to work with human driving model parameters 174, which can be used to customize and fine tune the operation of the vehicle control module 200. The human driving model parameters 174 can be stored in a memory 172 of the in-vehicle control system 150.

In the example embodiment, the vehicle control module 200 can be configured to include an interface with the in-vehicle control system 150, as shown in FIG. 1, through which the vehicle control module 200 can send and receive data as described herein. Additionally, the vehicle control module 200 can be configured to include an interface with the in-vehicle control system 150 and/or other ecosystem 101 subsystems through which the vehicle control module 200 can receive ancillary data from the various data sources described above. As described above, the vehicle control module 200 can also be implemented in systems and platforms that are not deployed in a vehicle and not necessarily used in or with a vehicle.

In an example embodiment as shown in FIG. 2, the vehicle control module 200 can be configured to include the abnormal command detection module 173 and the human driving model module 175, as well as other processing modules not shown for clarity. Each of these modules can be implemented as software, firmware, or other logic components executing or activated within an executable environment of the vehicle control module 200 operating within or in data communication with the in-vehicle control system 150. Each of these modules of an example embodiment is described in more detail below in connection with the figures provided herein.

System and Method for Using Human Driving Patterns to Detect and Correct Abnormal Driving Behaviors of Autonomous Vehicles A system and method for using human driving patterns to detect and correct abnormal driving behaviors of autonomous vehicles are disclosed herein. The various example embodiments described herein provide a system and method to detect dangerous or abnormal driving maneuvers and to guard the passengers against such situations. An example embodiment first trains a learning module or a normal human driving behavior model with normal driving maneuvers from human driving data. Then, the example embodiment provides a way to measure the distance between the current autonomous driving control process driving command and the corresponding normal human maneuver patterns from the learning module. If the distance is above a preset threshold, the system and method intercept and reduce or truncate the dangerous or abnormal maneuver of the current autonomous driving control process driving command to a preset safe bound and send out a warning.

An example embodiment can develop a human driving behavior model based on data related to various types of driving behaviors captured and retained by the human driving model module 175 of the example embodiment. The example embodiment can use actual empirical data captured through vehicle sensor subsystems and driving simulation data to model typical human driving behaviors. This empirical data and simulation data is captured and used by the human driving model module 175 to encode data corresponding to these typical driving behaviors as mathematical or data representations. The data can be encoded as a neural network, rules sets, or other well-known methods for developing machine learning systems. The empirical data can be captured for a single vehicle and/or aggregated from data collected from a large population of vehicles and drivers. Over time, the human driving model module 175 can learn typical driving behaviors, identify and retain driving behaviors deemed normal and safe, and expunge behaviors deemed unsafe or residing outside common operational thresholds.

For example, an embodiment can learn a common human driving behavior, such as one related to steering an autonomous vehicle and/or passing an obstacle (e.g., another vehicle) in the roadway. The human driving model module 175 can receive empirical data and simulation data related to driving behaviors that correspond to a steering angle applied to the steering controls of the vehicle as a function of time. Abrupt, swerving, or unsafe turn rates, indicated by steep steering angle slopes, can be detected and expunged from the human driving model. Typically, when a vehicle is driven by human drivers and the driver performs a left-side or right-side passing maneuver, the relationship between the steering angle and time can be learned and retained as a smooth data curve and a corresponding function by the human driving model module 175. As such, data corresponding to these steering and passing behaviors can be received, retained as a mathematical or data representation, and learned by the human driving model module 175 of an example embodiment.

An example embodiment can also learn a common driving behavior related to accelerating or decelerating an autonomous vehicle and/or managing the speed of the vehicle. The human driving model module 175 can receive empirical data and simulation data related to driving behaviors that correspond to a throttle level or throttle percentage applied to the engine or drivetrain controls of the vehicle as a function of time. An initial increase in the throttle percentage for a period of time can indicate an accelerating or vehicle speed increase behavior as typical when a vehicle passes an obstacle, such as another vehicle on the roadway. The slope of the throttle percentage indicates the typical rate of acceleration for this type of driving behavior. Abrupt or unsafe acceleration rates, indicated by steep throttle percentage slopes, can be detected and expunged from the human driving model. In a corresponding fashion, a decelerating throttle percentage for a period of time can indicate a decelerating action or a vehicle speed decrease behavior. Abrupt or unsafe deceleration rates, indicated by steep throttle percentage slopes, can be detected and expunged from the human driving model. Typically, when a vehicle is driven by human drivers and the driver performs an acceleration or deceleration maneuver, the relationship between the throttle percentage and time can be learned and retained as a smooth data curve and a corresponding function by the human driving model module 175. As such, data corresponding to these acceleration or deceleration behaviors can be received, retained as a mathematical or data representation, and learned by the human driving model module 175 of an example embodiment.

An example embodiment can also learn a common driving behavior related to braking or stopping an autonomous vehicle and/or managing the speed of the vehicle. The human driving model module 175 can receive empirical data and simulation data related to driving behaviors that correspond to a braking level or braking percentage applied to the braking controls of the vehicle as a function of time. An initial increase in the braking percentage for a period of time can indicate a vehicle stopping behavior as typical when a driver depresses the brake pedal. The slope of the braking percentage indicates the typical rate of braking for this type of driving behavior. Abrupt or unsafe braking rates, indicated by steep braking percentage slopes, can be detected and expunged from the human driving model. In a corresponding fashion, a reduced or decreasing braking percentage for a period of time can indicate a reduced vehicle braking behavior. Typically, when a vehicle is driven by human drivers and the driver performs a braking maneuver, the relationship between the braking percentage and time can be learned and retained as a smooth data curve and a corresponding function by the human driving model module 175. As such, data corresponding to these braking behaviors can be received, retained as a mathematical or data representation, and learned by the human driving model module 175 of an example embodiment.

Figure 3:
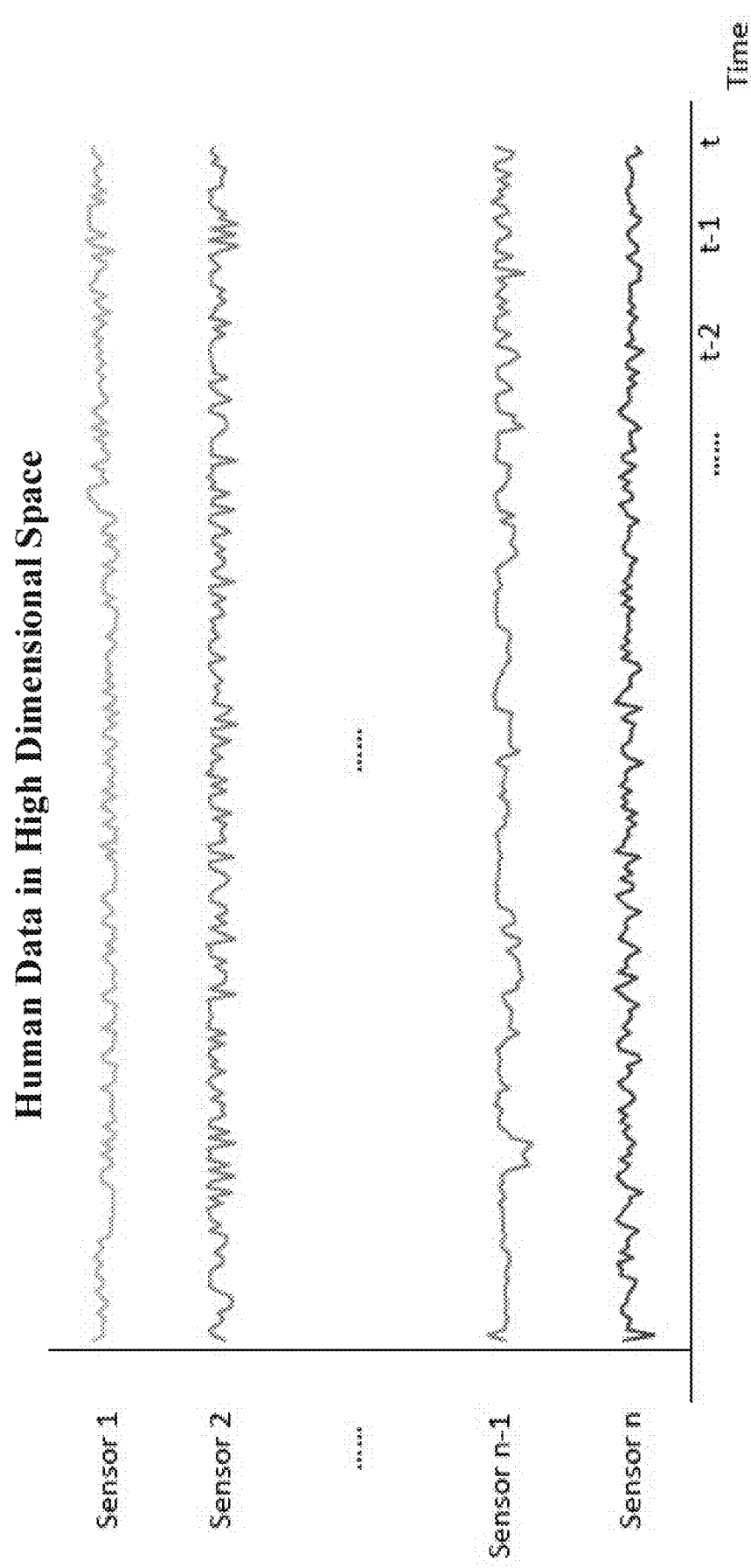
FIG. 3 illustrates a plot of typical human driver behavior data in a high dimensional space.
Figure 4:
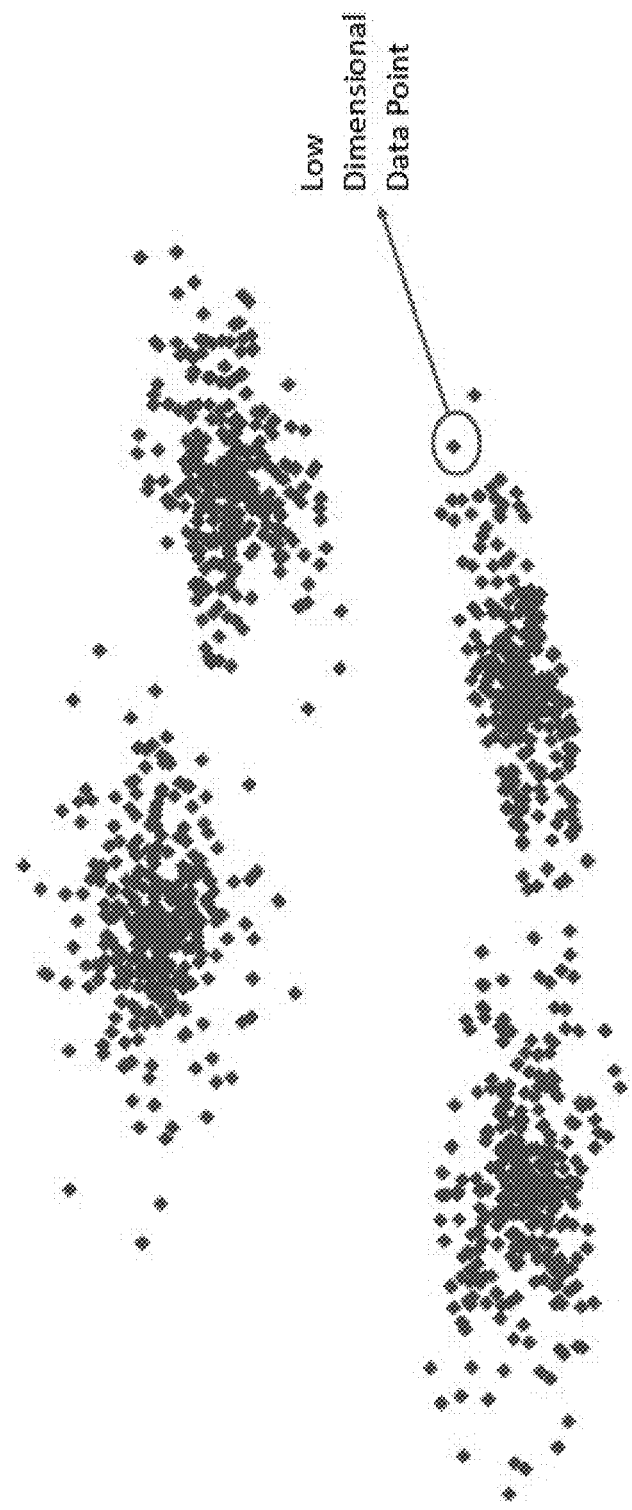
FIG. 4 illustrates a plot of typical human driver behavior data in a low dimensional space.
Figure 5:
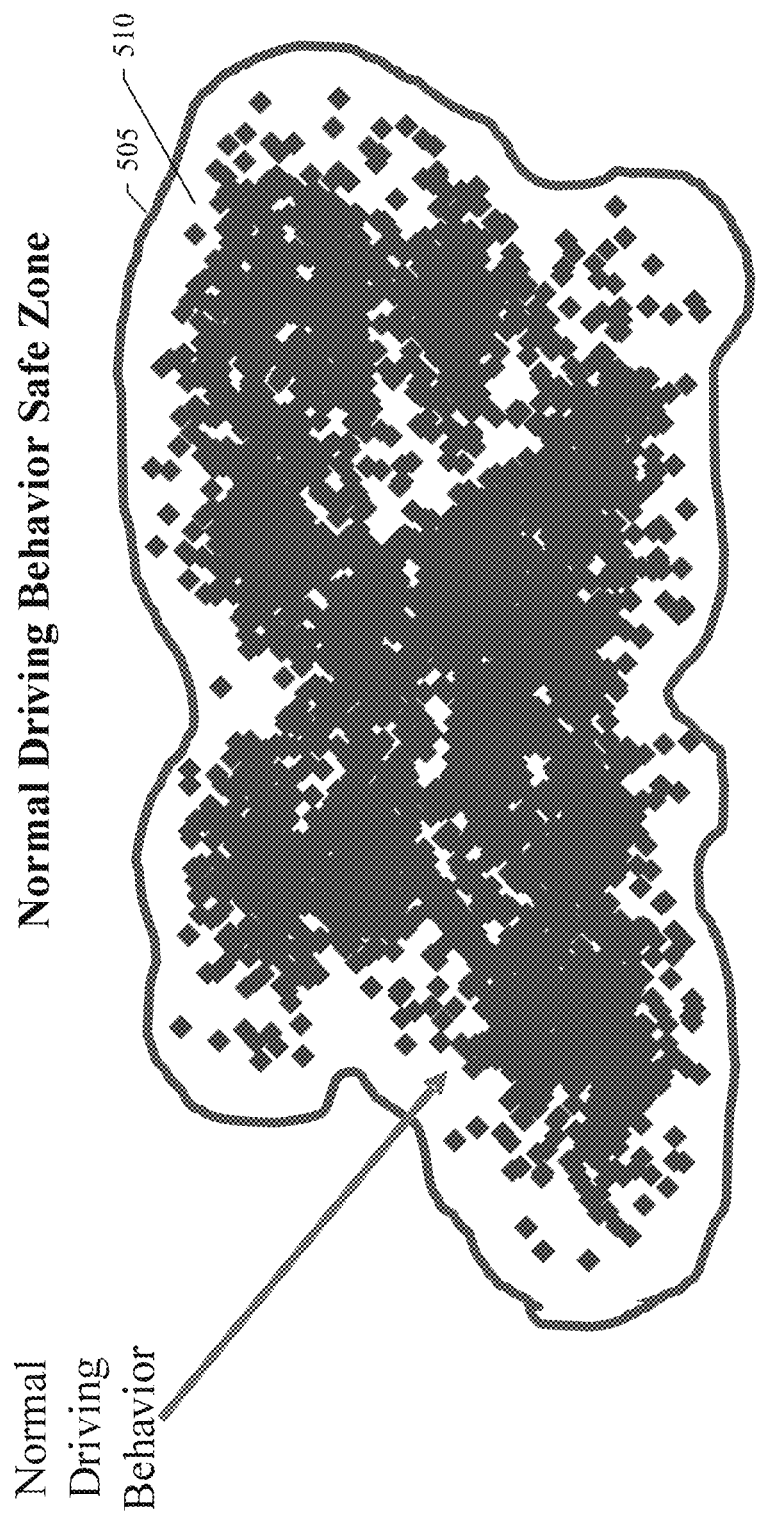
FIG. 5 illustrates a boundary or minimum bounding box drawn around a cluster of typical human driver behavior data.

As described above, the human driving model module 175 of an example embodiment can develop a human driving behavior model based on data related to various types of driving behaviors. This data can be aggregated over many drivers, vehicles, driving scenarios, and driving conditions. Sensor data for the each of the vehicles being used to train the human driving behavior model can be captured and plotted on a graph, such as the graph shown in FIG. 3. FIG. 3 illustrates a plot of human driver behavior data based on sensor data received over time from sensors in each of a multitude of vehicles being used to train the human driving behavior model. The data plotted on the graph shown in FIG. 3 can also include data from a vehicle driving simulation system. The graph shown in FIG. 3 illustrates a plot of typical aggregated human driver behavior based on sensor data in a high dimensional space, wherein sensor data from a plurality of sensors is plotted as a function of time. The disbursement and dimensionality of this plotted data can be reduced by plotting or projecting the aggregated human driver behavior data into a low dimensional space, wherein sensor data from the plurality of sensors is projected. Data mining techniques can be used to perform this projection of the aggregated human driver behavior sensor data from a high dimensional space to a low dimensional space. In general, only data with useful and important information are clearly observed in the low dimensional space. An example of the projection of typical human driver behavior data into a low dimensional space is illustrated in FIG. 4. The projected sensor data shown in FIG. 4 illustrates a disbursed clustering effect produced by typical or normal driving behaviors that tend to follow consistent trends or patterns. In other words, normal or typical drivers tend to exhibit similar driving behaviors. The projected data shown in FIG. 4 illustrates a relatively consistent disbursed clustering effect produced by the typical or normal driving behaviors that tend to follow consistent trends or patterns. As such, the projected cluster of typical human driver behavior data as shown in FIG. 4 tends to define one or more point clouds or multi-dimensional shapes, which can be shown as two-dimensional shapes for clarity and simplicity. For the purpose of illustration, one of the four point clouds shown in the example of FIG. 4 is isolated and zoomed in to produce the point cloud shown in FIG. 5. Thus, FIG. 5 illustrates a point cloud or multi-dimensional shape representing sensor data corresponding to typical human driver behavior. As shown in FIG. 5, a boundary or minimum bounding box 505 can be drawn around the cluster of typical human driver behavior data. The interior region of this bounding box 505 represents the data corresponding to normal, typical, or safe driving behaviors and represents a normal driving behavior safe zone 510. Data corresponding to driving behaviors that do not reside within the bounding box 505 can be considered abnormal, atypical, or unsafe driving behaviors. As described in more detail below, this normal driving behavior safe zone 510 can be used to detect and correct abnormal, atypical, or unsafe driving behaviors in autonomous vehicles.

Figure 6:
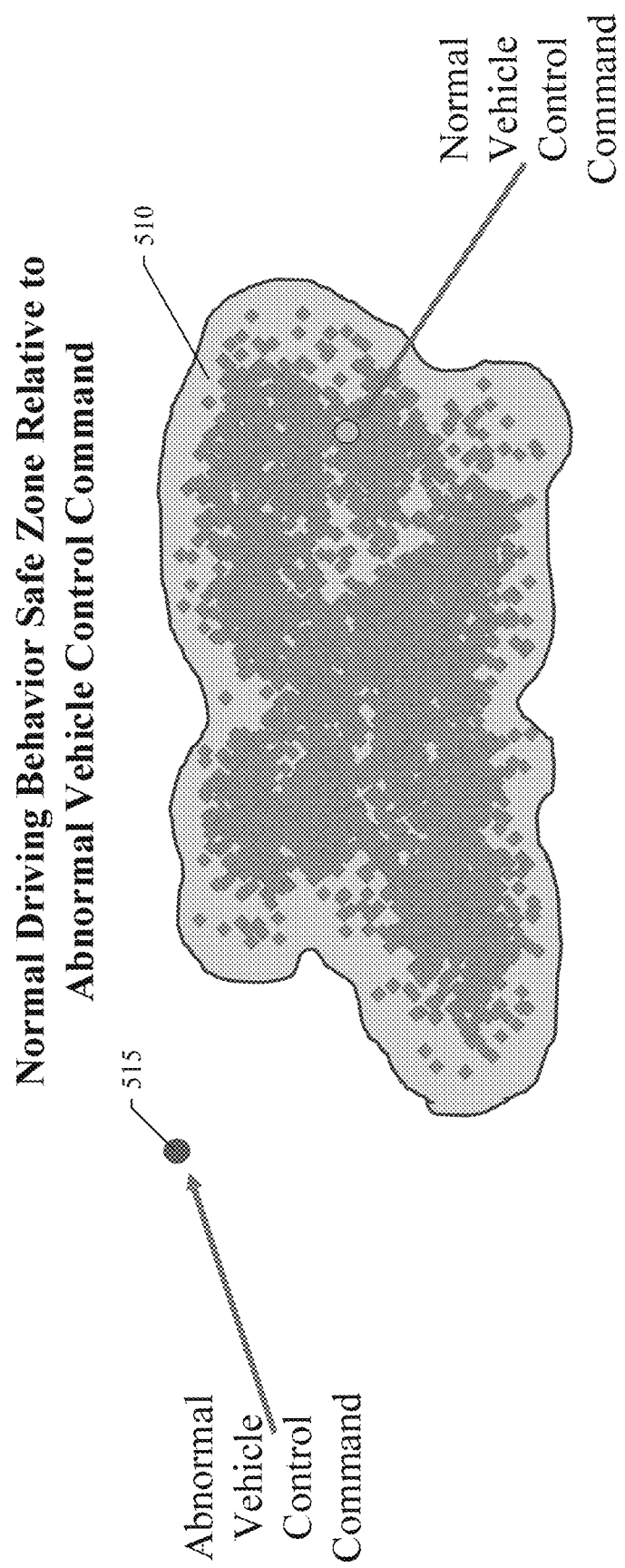
FIGS. 6 and 7 illustrate a process in an example embodiment for comparing a proposed vehicle control command with a normal driving behavior safe zone to determine if the proposed vehicle control command is within the normal driving behavior safe zone.

Referring now to FIG. 6, an example embodiment includes a process for comparing a proposed vehicle control command 210 with the normal driving behavior safe zone 510 to determine if the proposed vehicle control command 210 is within the normal driving behavior safe zone 510. During the process of controlling the movement of the vehicle 105, the in-vehicle control subsystem 150 can issue many control commands to the vehicle control subsystems 146 to perform a variety of driving behaviors or maneuvers. Prior to actually commanding the vehicle control subsystems 146 to perform a particular maneuver, the in-vehicle control subsystem 150 can issue a proposed vehicle control command 210 to the vehicle control module 200. As described in more detail below, the vehicle control module 200, and the abnormal command detection module 173 therein, can compare the proposed vehicle control command 210 with the normal driving behavior safe zone 510 to determine if the proposed vehicle control command 210 is within the normal driving behavior safe zone 510. In other words, the abnormal command detection module 173 can determine if the proposed vehicle control command 210 is a normal, typical, and safe control command.

Referring again to FIG. 6, the normal driving behavior safe zone 510, as generated in the manner described above, is shown. The interior of the normal driving behavior safe zone 510 represents data associated with normal, typical, and safe vehicle control commands. In an example embodiment, the in-vehicle control subsystem 150 might issue a proposed vehicle control command 210 to the abnormal command detection module 173, for which data plotted on the graph shown in FIG. 6 might result in a point 515 positioned as shown. The point 515 represents a location on the graph that corresponds to the sensor data that would result from the vehicle control manipulations defined by the proposed vehicle control command 210. The abnormal command detection module 173 can plot the proposed vehicle control command 210 on the graph as shown in FIG. 6. As described above, the human driving model module 175 can also plot the normal driving behavior safe zone 510 on the graph as shown in FIG. 6.

Figure 7:
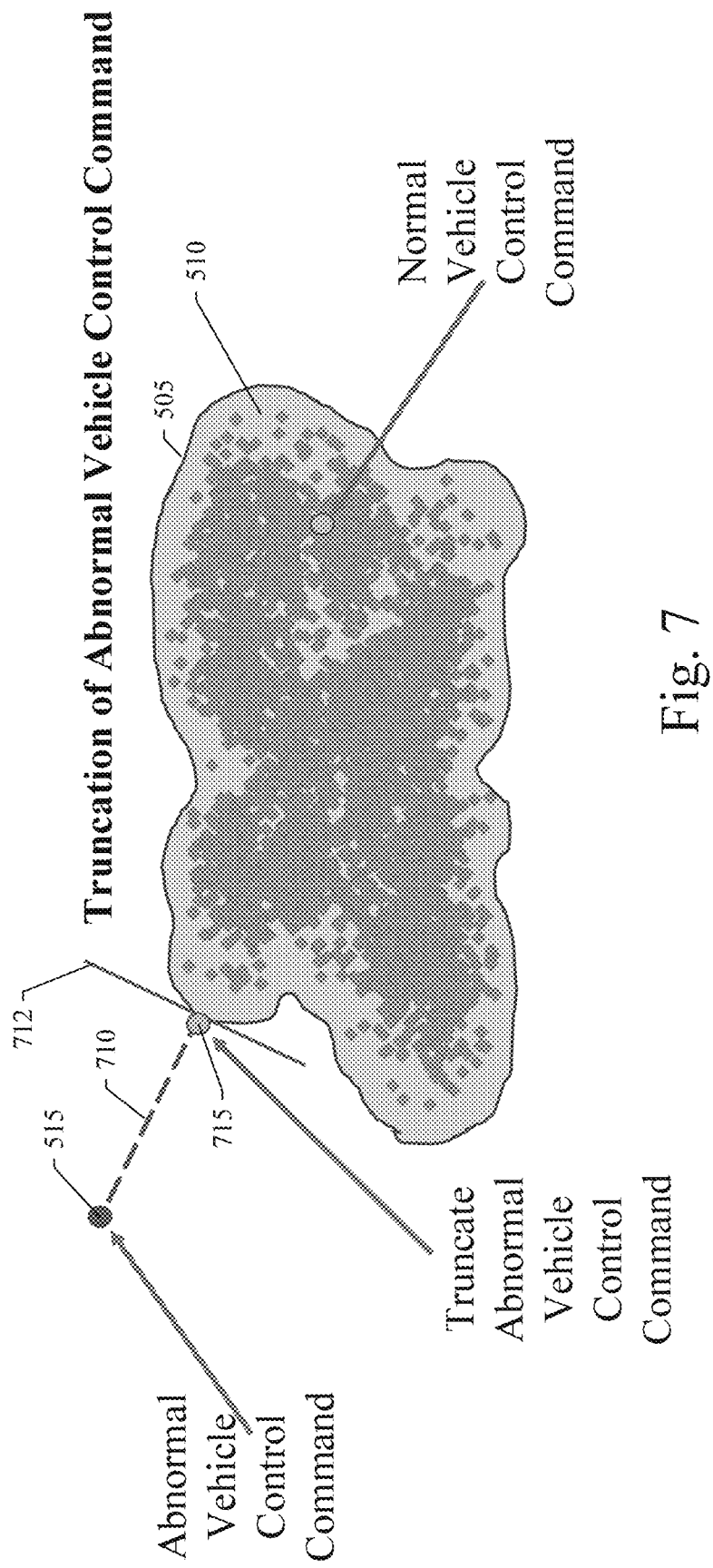

Referring now to FIG. 7, the abnormal command detection module 173 has plotted the proposed vehicle control command 210 on the graph as point 515. The abnormal command detection module 173 can determine a distance from the point 515, corresponding to the proposed vehicle control command 210, to a nearest point 715 on or within the normal driving behavior safe zone 510. A tangent line 712 perpendicular to a distance vector 710 and tangential to the boundary of the normal driving behavior safe zone 510 can be used to find the nearest point 715 on the bounding box 505 of the normal driving behavior safe zone 510. The point 715 represents the closest or nearest point of the normal driving behavior safe zone 510 to the proposed vehicle control command 210 at point 515. As such, the point 715 represents a normal or safe vehicle control command that is most similar to the proposed vehicle control command 210. The distance from point 515 to point 715 is defined by the distance vector 710. If the distance from point 515 to point 715 is not greater than zero (i.e., the point 515 is located on or within the normal driving behavior safe zone 510), the abnormal command detection module 173 has detected a normal or safe proposed vehicle control command 210. In this case, the abnormal command detection module 173 can validate the proposed vehicle control command 210 and pass the validated vehicle control command 220 on to the vehicle control subsystems 146 for execution. Conversely, if the distance from point 515 to point 715 is greater than zero (i.e., the point 515 is not located on or within the normal driving behavior safe zone 510), the abnormal command detection module 173 has detected an abnormal or unsafe proposed vehicle control command 210. In one embodiment, the abnormal command detection module 173 can simply reject or invalidate the proposed vehicle control command 210 and issue an error or warning alert message. In another embodiment, the abnormal command detection module 173 can actively modify the unsafe proposed vehicle control command 210 to produce a safe vehicle control command that is most similar to the unsafe proposed vehicle control command 210. The active modification of the unsafe proposed vehicle control command 210 can be accomplished by truncating or replacing the unsafe proposed vehicle control command 210 with a modified and validated vehicle control command 220 corresponding to the point 715, which is the closest point in the normal driving behavior safe zone 510 to the proposed vehicle control command 210. As such, the modified vehicle control command 220 will represent a normal or safe vehicle control command that is most similar to the unsafe proposed vehicle control command 210. In an example embodiment, the abnormal command detection module 173 can also issue an error or warning alert message when the unsafe proposed vehicle control command 210 is modified as described herein. The modified and validated vehicle control command 220 can be passed on to the vehicle control subsystems 146 for execution. As such, the abnormal command detection module 173 can ensure that a normal and safe vehicle control command is always sent to the vehicle control subsystems 146 for execution and that an abnormal or unsafe control command is never sent to the vehicle control subsystems 146 for execution. As a result, the operation of the vehicle control module 200 as described herein provides an assurance that the vehicle 105 is always controlled in a normal and safe manner.

Figure 8:
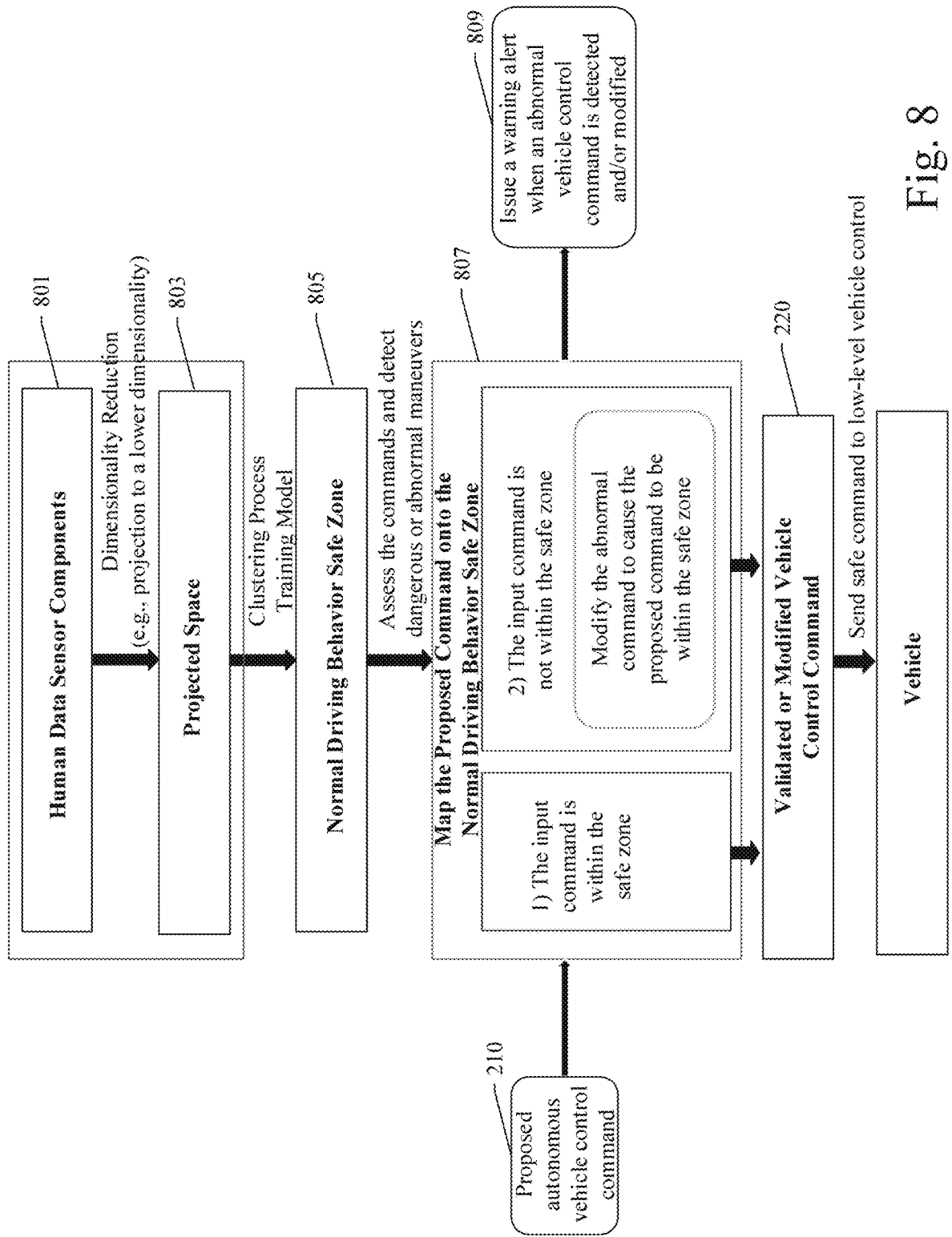
FIG. 8 illustrates an example embodiment of a system and method for using human driving patterns to detect and correct abnormal driving behaviors of autonomous vehicles.

Referring now to FIG. 8, a process diagram illustrates an example embodiment of a system and method for detection and correction of an abnormal vehicle control command. As shown, an example embodiment can be configured to use the human driving model module 175 to process human driving data captured from a plurality of sensor components on a multitude of vehicles for which training data is retained. As described in regard to FIG. 3, the aggregated human driving behavior sensor data can be plotted on a graph in a high dimensional space with a plurality of sensor data points (operation block 801 shown in FIG. 8). As described in regard to FIG. 4, the disbursement and dimensionality of this plotted data can be reduced by plotting or projecting the aggregated human driver behavior data into a low dimensional space, wherein sensor data from the plurality of sensors is projected (operation block 803 shown in FIG. 8). As described in regard to FIG. 5, a boundary or minimum bounding box can be drawn around the cluster of typical human driver behavior data to produce a normal driving behavior safe zone (operation block 805 shown in FIG. 8). Once the data and graph corresponding to the normal driving behavior safe zone is generated by the human driving model module 175, the abnormal command detection module 173 can begin to receive proposed vehicle control commands 210. In operation block 807 shown in FIG. 8 and as detailed in regard to FIGS. 6 and 7, the abnormal command detection module 173 can compare the proposed vehicle control command 210 with the normal driving behavior safe zone to determine if the proposed vehicle control command 210 is within the normal driving behavior safe zone and thus a normal and safe command. If the proposed vehicle control command 210 is within the normal driving behavior safe zone, the abnormal command detection module 173 has detected a normal or safe proposed vehicle control command 210. In this case, the abnormal command detection module 173 can validate the proposed vehicle control command 210 and pass the validated vehicle control command 220 on to the vehicle control subsystems 146 for execution. Conversely, if the proposed vehicle control command 210 is not within the normal driving behavior safe zone, the abnormal command detection module 173 has detected an abnormal or unsafe proposed vehicle control command 210. In one embodiment, the abnormal command detection module 173 can simply reject or invalidate the proposed vehicle control command 210 and issue an error or warning alert message 809. In another embodiment, the abnormal command detection module 173 can actively modify the unsafe proposed vehicle control command 210 to produce a safe vehicle control command 220 that is most similar to the unsafe proposed vehicle control command 210. In an example embodiment, the abnormal command detection module 173 can also issue an error or warning alert message 809 when the unsafe proposed vehicle control command 210 is modified as described herein. The modified and validated vehicle control command 220 can be passed on to the vehicle control subsystems 146 for execution.

Figure 9:
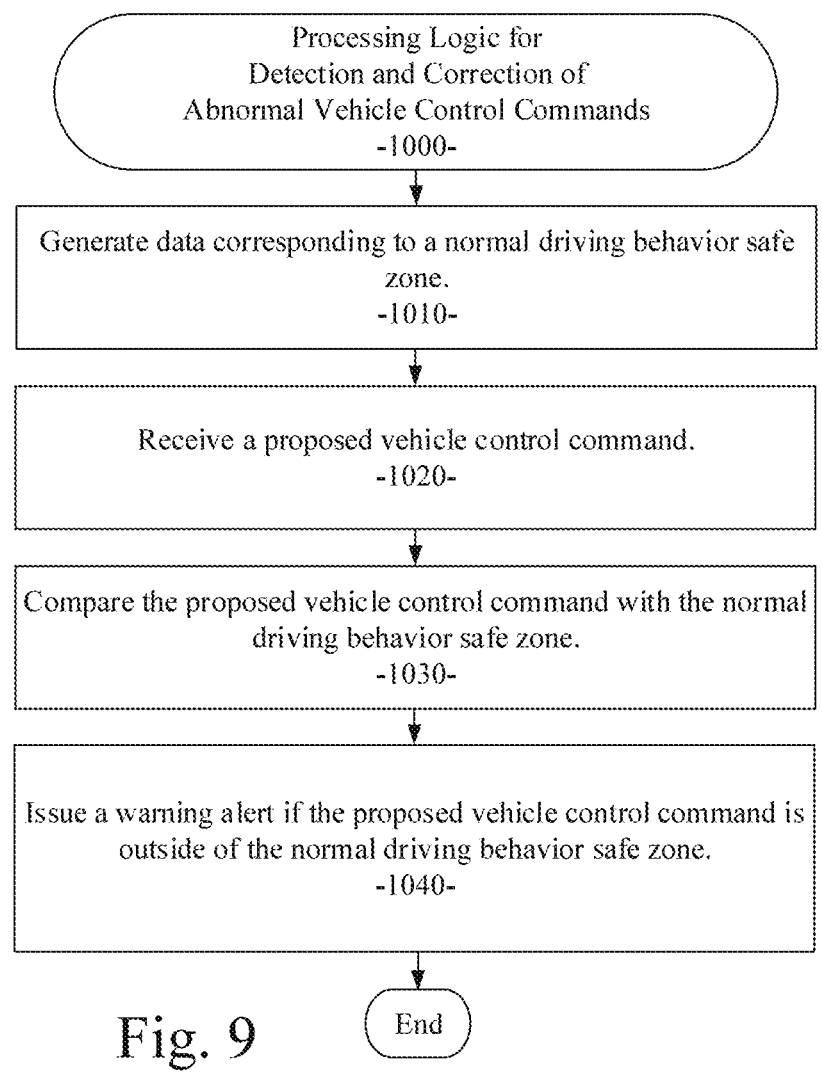
FIG. 9 is a process flow diagram illustrating an example embodiment of a system and method for using human driving patterns to detect and correct abnormal driving behaviors of autonomous vehicles.

Referring now to FIG. 9, a flow diagram illustrates an example embodiment of a system and method 1000 for detection and correction of an abnormal vehicle control command. The example embodiment can be configured for: generating data corresponding to a normal driving behavior safe zone (processing block 1010); receiving a proposed vehicle control command (processing block 1020); comparing the proposed vehicle control command with the normal driving behavior safe zone (processing block 1030); and issuing a warning alert if the proposed vehicle control command is outside of the normal driving behavior safe zone (processing block 1040).

As used herein and unless specified otherwise, the term "mobile device" includes any computing or communications device that can communicate with the in-vehicle control system 150 and/or the vehicle control module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150 and/or the vehicle control module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the vehicle control module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the vehicle control module 200 can be implemented using systems that enhance the security of the execution environment, thereby improving security and reducing the possibility that the in-vehicle control system 150 and/or the vehicle control module 200 and the related services could be compromised by viruses or malware. For example, the in-vehicle control system 150 and/or the vehicle control module 200 can be implemented using a Trusted Execution Environment, which can ensure that sensitive data is stored, processed, and communicated in a secure way.

Figure 10:
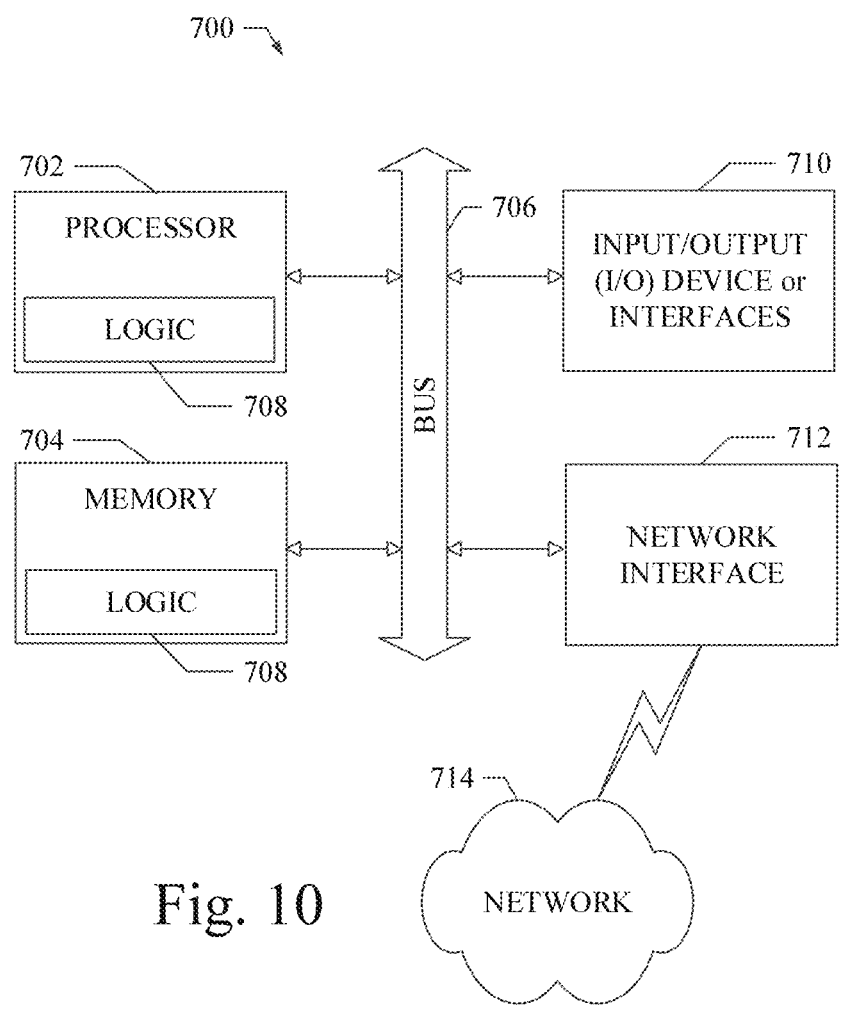
FIG. 10 shows a diagrammatic representation of machine in the example form of a computer system within which a set of instructions when executed may cause the machine to perform any one or more of the methodologies discussed herein.

FIG. 10 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth®, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   a data processor; and
   a vehicle control module, executable by the data processor, the vehicle control module being configured to:
   determine, by use of the data processor, if a proposed vehicle control command does not comply with data corresponding to a normal driving behavior aggregated across a plurality of driver behaviors;
   modify, by use of the data processor, the non-compliant proposed vehicle control command to comply with the data corresponding to the normal driving behavior; and
   pass, by use of the data processor, the modified proposed vehicle control command to a vehicle subsystem to modify operation of an autonomous vehicle based on the modified proposed vehicle control command.

2. The system of claim 1, wherein the vehicle control module is further configured to capture data through vehicle sensor subsystems and driving simulation data to model typical human driving behaviors.

3. The system of claim 1, wherein the vehicle control module is further configured to plot data corresponding to typical human driving behaviors on a graph.

4. The system of claim 1, wherein the vehicle control module is further configured to determine a distance from a point on a graph corresponding to the proposed vehicle control command to a nearest point on or within a normal driving behavior safe zone.

5. The system of claim 1, wherein the vehicle control module is further configured to replace the proposed vehicle control command with a modified vehicle control command corresponding to a point, which is the closest point of a normal driving behavior safe zone to the proposed vehicle control command.

6. The system of claim 1 wherein a normal driving behavior safe zone is configured to retain information corresponding to human driving behaviors as mathematical or data representations.

7. The system of claim 1 wherein the vehicle control module is further configured to modify the proposed vehicle control command to produce a modified and validated vehicle control command if the proposed vehicle control command does not comply with the data corresponding to the normal driving behavior.

8. The system of claim 7 wherein the modified and validated vehicle control command is output to a vehicle control subsystem causing an autonomous vehicle to follow a trajectory corresponding to the modified and validated vehicle control command.

9. A method comprising:
   determining, by use of a data processor, if a proposed vehicle control command does not comply with data corresponding to a normal driving behavior aggregated across a plurality of driver behaviors;
   modifying, by use of the data processor, the non-compliant proposed vehicle control command to comply with the data corresponding to the normal driving behavior; and
   passing, by use of the data processor, the modified proposed vehicle control command to a vehicle subsystem to modify operation of an autonomous vehicle based on the modified proposed vehicle control command.

10. The method of claim 9 comprising capturing the data through vehicle sensor subsystems and driving simulation data to model typical human driving behaviors.

11. The method of claim 10 comprising plotting the data corresponding to typical human driving behaviors on a graph.

12. The method of claim 9 comprising determining a distance from a point on a graph corresponding to the proposed vehicle control command to a nearest point on or within a normal driving behavior safe zone.

13. The method of claim 9 comprising replacing the proposed vehicle control command with a modified vehicle control command corresponding to a point, which is the closest point of a normal driving behavior safe zone to the proposed vehicle control command.

14. The method of claim 9 wherein a normal driving behavior safe zone is configured to retain information corresponding to human driving behaviors as mathematical or data representations.

15. The method of claim 9 comprising receiving the proposed vehicle control command.

16. A non-transitory machine-useable storage medium embodying instructions which, when executed by a machine, cause the machine to:
determine, by use of a data processor, if a proposed vehicle control command does not comply with data corresponding to a normal driving behavior aggregated across a plurality of driver behaviors;
modify, by use of the data processor, the non-compliant proposed vehicle control command to comply with the data corresponding to the normal driving behavior; and
pass, by use of the data processor, the modified proposed vehicle control command to a vehicle subsystem to modify operation of an autonomous vehicle based on the modified proposed vehicle control command.

17. The non-transitory machine-useable storage medium of claim 16 wherein the instructions are further configured to capture data through vehicle sensor subsystems and driving simulation data to model typical human driving behaviors.

18. The non-transitory machine-useable storage medium of claim 16 wherein the instructions are further configured to determine a distance from a point on a graph corresponding to the proposed vehicle control command to a nearest point on or within a normal driving behavior safe zone.

19. The non-transitory machine-useable storage medium of claim 16 wherein the instructions are further configured to use data mining techniques to project aggregated human driver behavior sensor data from a high dimensional space to a low dimensional space.

20. The non-transitory machine-useable storage medium of claim 16 wherein the instructions are further configured to modify the proposed vehicle control command to produce a modified and validated vehicle control command for controlling an autonomous vehicle.

* * * * *